(12) United States Patent
Brisebois et al.

(10) Patent No.: US 10,313,291 B2
(45) Date of Patent: Jun. 4, 2019

(54) METHOD FOR DETERMINING PREDICTIVE RESPONSE TIME ACROSS ENTERPRISE COMMUNICATION SYSTEMS

(71) Applicant: QUEST SOFTWARE INC., Aliso Viejo, CA (US)

(72) Inventors: Michel Albert Brisebois, Ontario (CA); Curtis T. Johnstone, Ontario (CA); Andrew J. Leach, Zhuhai (CN); Catherine Helbig Dibble, Santa Clara, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 443 days.

(21) Appl. No.: 14/719,121

(22) Filed: May 21, 2015

(65) Prior Publication Data
US 2016/0344672 A1  Nov. 24, 2016

(51) Int. Cl.
*H04L 12/58* (2006.01)
*H04L 29/08* (2006.01)
*G06Q 10/10* (2012.01)

(52) U.S. Cl.
CPC .......... *H04L 51/26* (2013.01); *G06Q 10/107* (2013.01); *H04L 51/02* (2013.01); *H04L 51/14* (2013.01); *H04L 67/22* (2013.01)

(58) Field of Classification Search
CPC ....... G06Q 10/10–10/107; H04L 51/02–51/34; H04L 63/0236; H04L 63/168; H04L 63/0245; H04L 63/10; H04L 63/6218; H04L 41/0659; H04L 41/0695; H04L 67/22
See application file for complete search history.

(56) References Cited

U.S. PATENT DOCUMENTS

| 7,047,212 | B1 | 5/2006 | Pych et al. | |
| 7,590,696 | B1* | 9/2009 | Odell | G06Q 10/107 455/466 |
| 7,921,292 | B1* | 4/2011 | Pauker | H04L 9/083 713/171 |
| 9,305,289 | B2 | 4/2016 | Roic et al. | |
| 2004/0243679 | A1* | 12/2004 | Tyler | G06Q 10/107 709/206 |

(Continued)

OTHER PUBLICATIONS

U.S. Appl. No. 14/731,278, Kevin A. Horvatin, Migrate Nickname Cache for Email Systems and Devices, filed Jun. 4, 2015.

(Continued)

*Primary Examiner* — Wing F Chan
*Assistant Examiner* — Rajeshwari Krishnan
(74) *Attorney, Agent, or Firm* — Maschoff Brennan

(57) ABSTRACT

A method for determining predictive response time for electronic mail across enterprise communication systems is described. In particular, the method includes collecting and subsequently analyzing communications of a particular recipient in order to determine a probability of a sender receiving a response from the recipient. In the event a response is probable, the method also determines a time frame when a response may be sent. In situations where the recipient is non-responsive, the method also provides a list of alternate recipients that the sender can communicate with, whereby the alternate recipients are more responsive than the original recipient.

17 Claims, 6 Drawing Sheets

(56) References Cited

U.S. PATENT DOCUMENTS

| | | | |
|---|---|---|---|
| 2005/0050547 A1 | 3/2005 | Whittle et al. | |
| 2006/0045124 A1* | 3/2006 | Dahlstrom | H04L 63/0236 370/465 |
| 2006/0168049 A1* | 7/2006 | Orozco | H04L 51/04 709/206 |
| 2006/0242109 A1 | 10/2006 | Pereira et al. | |
| 2007/0016643 A1* | 1/2007 | Boss | H04L 51/04 709/206 |
| 2008/0005355 A1* | 1/2008 | Craft | G06Q 10/107 709/245 |
| 2008/0278740 A1 | 11/2008 | Bird et al. | |
| 2009/0159509 A1 | 6/2009 | Wojdyla et al. | |
| 2010/0169264 A1* | 7/2010 | O'Sullivan | G06Q 10/10 706/52 |
| 2010/0250682 A1* | 9/2010 | Goldberg | H04L 51/34 709/206 |
| 2011/0218845 A1* | 9/2011 | Medina | G06Q 30/0208 705/14.11 |
| 2014/0089235 A1* | 3/2014 | Lynar | H04L 51/02 706/12 |
| 2015/0106490 A1* | 4/2015 | Floyd, III | H04L 41/0659 709/223 |
| 2016/0357438 A1 | 12/2016 | Horvatin | |
| 2016/0357735 A1 | 12/2016 | Horvatin | |

OTHER PUBLICATIONS

U.S. Appl. No. 14/731,283, Kevin A. Horvatin, Determine Confidence of Mail Archive Ownership From Senders in "Sent Items" Folder, filed Jun. 4, 2015.

Nir Sofer; NK2Edit v1.10, Jun. 17, 2010, NirSoft, https://web.archive.org/web/20100617161401/http://www.nirsoft.net/utils/outlook_nk2_edit.htmland https://web.archive.org/web/20100617161401/http://www.nirsoft.net/utils/nk2edit_menus.html, pp. 1-6.

Wiseman, Steve; Backup and Restore Outlook 2003 Auto Complete Data, Sep. 4, 2007, IntelliAdmin, http://www.intelliadmin.com/index.php/2007/09/backup-and-restore-outlook-2003-auto-complete-data/, pp. 1-7.

U.S. Appl. No. 14/731,278 Office Action dated Jul. 14, 2017.

* cited by examiner

METHOD FOR DETERMINING PREDICTIVE RESPONSE TIME ACROSS ENTERPRISE COMMUNICATION SYSTEMS

BACKGROUND

Field of Invention

The present invention generally relates to data aggregation and analysis. More specifically, the present invention relates to determining predictive response time across enterprise communication systems.

Description of the Related Art

Businesses have access to an inordinate amount of information. For example, businesses collect data relating to customers, vendors, sales, inventory, employees, research and competitors. Some of this data is knowingly collected or stored for business purposes. For example, a business may record or store sales numbers for tax reasons and/or for determining whether to expand production or cease production of specific products. Often there exists a large amount of additional data or metadata that is accessible by a business. These additional data or metadata may be ignored because the data is difficult to access or because the business is unaware that the metadata exists (e.g., data that can be obtained from data to which the business currently has access). Generally, this metadata includes mined data that can be extracted from the data that the business collects or generates. The metadata can also include trends related to the data available to the business.

For example, a business may have enough data to determine the amount of time spent per dollar earned from each customer. The business may not be able to easily extract this information from the data available, however, because a determination may require accessing a number of separate systems and performing some amount of data mining or additional processing. In some cases, to determine the time spent per dollar earned from each customer, a business may need to examine sales numbers as well as the time and resources spent by each employee of the business who was involved in generating the sale. The time and resources to generate the sale could include more than just the time spent by a salesperson communicating with the customer. For example, the time and resources could also include the amount of time support staff (e.g., assistants) dedicate for each customer, the amount of time spent by technical support helping the customer, the resources used (e.g., paper, sample products), the amount of time sales teams spend to determine the best strategy for approaching the customer and delivery costs.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Businesses may also collect and store data relating to their own day-to-day operations. In some cases, businesses may be in the practice of storing electronic mail (e-mail) that is sent and/or received by the business. Because e-mail can be a form of communication between two or more parties that is both fast and convenient, e-mail can be largely relied on by businesses for everyday functions including facilitating internal communication with employees and facilitating external communications with various other entities including customers, clients, partners and vendors. Numerous e-mails may be sent and/or received by a particular business in a given day. There is, however, no apparent method available to determine a possible time frame regarding when a particular e-mail may be responded to. This uncertainty may raise various inefficiencies as the business and other associated parties may be waiting around for information to be exchanged. Knowledge about when a response can be expected, or even, in other situations, to whom to send the message, can be desirable when a timely response is needed.

SUMMARY OF THE CLAIMED INVENTION

A method for determining predictive response time across enterprise communication systems is claimed. The method includes a plurality of steps directed at providing a user with a prediction as to when a response from an intended recipient of a communication can be expected. The method can also provide the user with a list of alternative recipients that the user can contact where the alternate recipients can provide the user with information related to the communication or forward the communication to the intended recipient. The prediction and the list of alternate recipients may be obtained by collecting and subsequently evaluating various communications associated with each individual.

A system for determining predictive response time across enterprise communication systems is also claimed. The system includes various elements directed at providing a user with a prediction as to when a response from an intended recipient of a communication can be expected. The system can also provide the user with a list of alternative recipients that the user can contact where the alternate recipients can provide the user with information related to the communication or forward the communication to the intended recipient. The prediction and the list of alternate recipients may be obtained by collecting and subsequently evaluating various communications associated with each individual.

DETAILED DESCRIPTION

In various embodiments, the systems and methods described herein can facilitate determining predictive response time (PRT) across enterprise communication systems. Numerous communications (e.g., e-mails, instant messages) may be sent and/or received by any one individual in a given day. There exists uncertainty around if and when a sender receives a return message from a particular recipient. The present invention aims to evaluate various factors that influence whether a recipient of a communication will actually respond and when the response can be expected. Alternatively, the present invention can also output a list of alternative recipients that the sender can also contact. The list of alternative recipients may be capable of forwarding the communication to the original recipient. In some cases, the alternative recipient may be capable of providing the user with the same type of information that the particular recipient would have provided in a response.

Figure 1:
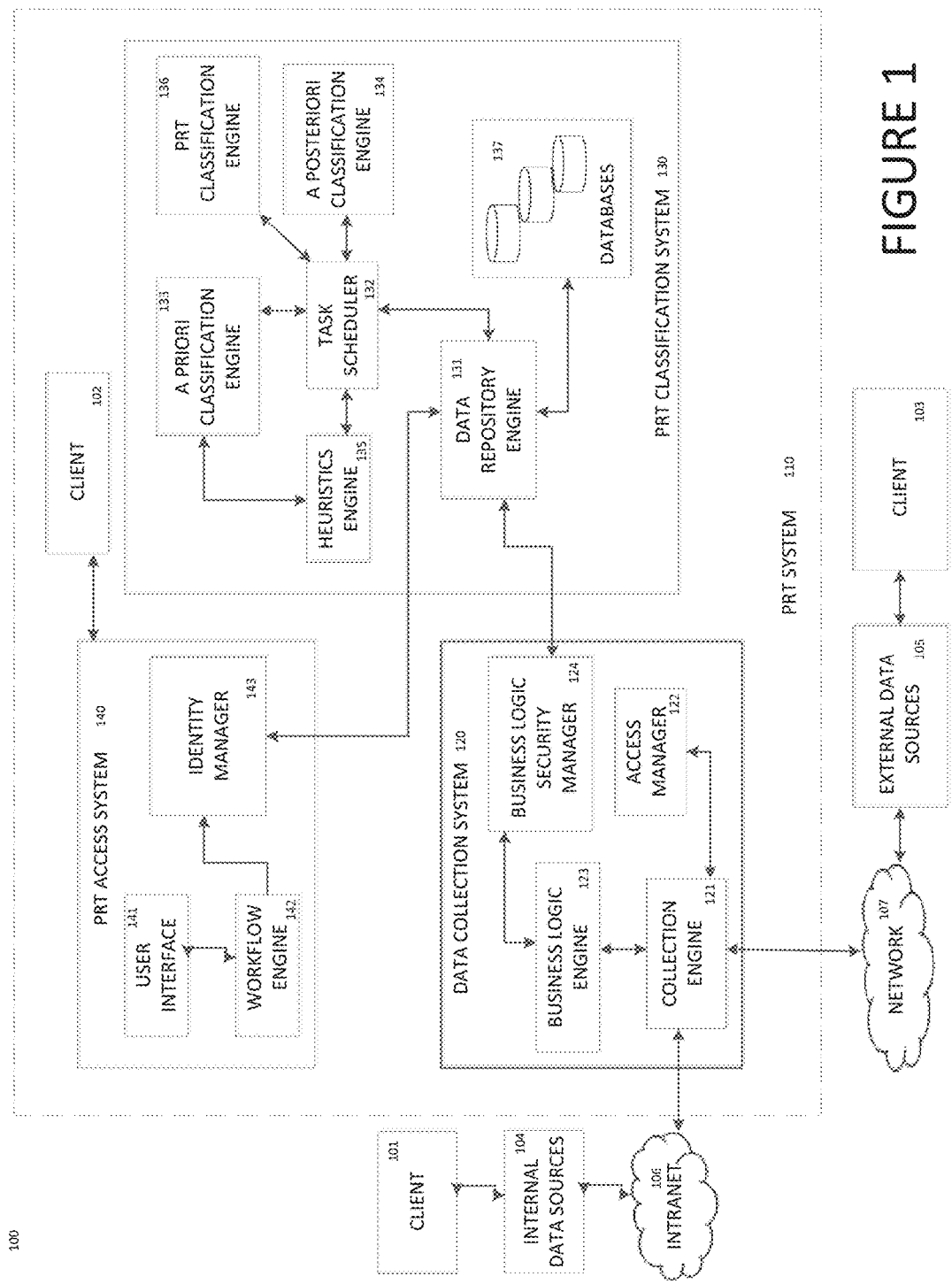
FIG. 1 illustrates system for determining predictive response time across enterprise communication systems.

FIG. 1 illustrates system for determining predictive response time across enterprise communication systems. The system 100 can be included in a computing environment that is associated with a business or organization and may vary based on the associated business or organization.

For purposes of this disclosure, the concept of PRT across enterprise communication systems can be applied to generate PRT-based predictions. In particular, the predictions can be applied to 1) a likelihood of a response from the recipient with respect to a particular communication and 2) an estimate response time as to when the response to the communication can be expected by the sender. The prediction can look into the various factors in order to calculate the prediction.

There may be various factors that influence whether a recipient of a communication actually provides a response to the sender and/or when the response to the sender can be expected. These factors may relate to the sender, to the recipient or to the subject matter of the communication. Such factors may include, but not limited to, any existing communication or work-related relationship between the sender and the recipient, relevance and urgency of the subject matter of the communication, and general availability of the recipient.

By using the predictions, embodiments may also provide the sender with a list of alternative recipients. The list of alternative recipients may include other individuals that may have a higher likelihood of responding to the communication from the sender or have a faster response time. In some situations, these alternative recipients may possess similar knowledge as the original recipient on a requested topic. In other situations, these alternative recipients may be able to forward the message to the original recipient.

An example situation that can illustrate the above concept for PRT predictions is provided herein. There may be a single employee (referred to as the sender) within a company who may be seeking information from a high level official within the same company (e.g., the CEO) (referred to as the recipient). The employee may request the information from the CEO through the use of various modes of communication (e.g., e-mail). As indicated above, there may be many factors that can influence if and when the CEO responds to the employee's email. Therefore, the employee may generally not know if and when a response from the CEO can be expected. With the use of PRT prediction, however, past communications of the CEO can be analyzed and used to inform the employee about a probability that the employee receives a response and corresponding time frame that a response can be expected.

With respect to other embodiments, the employee may also be provided with alternative recipients that the employee can communicate with in the event that the CEO is generally non-responsive. These alternative recipients may be included in a list. The list of alternative recipients can be provided to the employee. The list itself may be organized based on various parameters such as based on who is most likely to respond or who may respond the fastest. The list may be used by the employee as a way to obtain the requested information with a greater success. For example, these alternative recipients (e.g., co-workers of the CEO) may have the information that the employee is requesting but are more likely to answer. In another example, these alternative recipients may be more responsive to e-mails in general and can directly interface with the CEO (e.g., the CEO's secretary).

Although the following disclosure relates to calculating predictions for e-mails between a sender and a recipient, it should be noted that the present invention can also be applied to other forms of communications as well. Similar to e-mails, other communications, including instant messaging, may have various factors that influence if and when a response is provided back to a sender of an initial communication. For these other communications, the present invention can also be used to analyze relevant data about the sender, recipient and communication in order to calculate similar predictions regarding if and when a response can be expected.

As used herein, the term "business," in addition to having its ordinary meaning, is intended to include any type of organization or entity. For example, a business can include a charitable organization, a governmental organization, an educational institution, or any other entity that may have one or more sources of data to analyze. Further, the user of any of the above terms may be used interchangeably unless explicitly used otherwise or unless the context makes clear otherwise. In addition, as used herein, the term "data" generally refers to electronic data or any type of data that can be accessed by a computing system.

Returning back to FIG. 1, the system 100 includes a predictive response time (PRT) system 100 that communicates with a plurality of clients 101-103, servers, databases 104, 105, mobile computing devices (e.g., tablets, laptops, smartphones), virtual computing devices, shared computing devices, and networked computing devices. The system 100 may also include one or more networks (e.g., intranet 106).

By using the PRT system 110, a user can examine the data available to a business regardless of where the data was generated or is stored. Some examples of data may include communications like electronic mail (e-mail). In some embodiments, the user can use the PRT system 110 to identify trends and/or metadata associated with the data available to the PRT system 110.

The PRT system 110 can access the data from internal data sources 104, external data sources 105, or a combination of the two. The data that can be accessed from the internal data sources 104 can include any data that is stored within the PRT system 110 or is accessed by a computing system that is associated with the PRT system 110. For example, the data may include information stored in employee created files, log files, archived files, internal emails, outgoing emails, received emails, received files, data downloaded from an external network or the Internet, and not-yet-transmitted emails in a drafts folder. Other types of communications outside of e-mail such as instant messaging (IM), enterprise social networks (e.g., Jive, Yammer), internet telephony (VoIP) or even teleconferencing (e.g., Microsoft Lync) may also utilize PRT data. Generally, any communication where a response is anticipated from a recipient can benefit from use of the PRT solution described herein. The type of data is not limited to what was identified above and may also depend on the organization or business associated with the system 100.

The data that can be accessed from the external data sources 105 can include any data that is stored outside of the PRT system 110 and is publicly accessible or otherwise accessible to the PRT system 110. For example, the data can include data from social networking sites, customer sites, Internet sites, or any other data source that is publicly accessible or which the PRT system 110 has been granted access. In some cases, a subset of the data may be unavailable to the PRT system 110. In such cases, the unavailable data may be private.

The internal data sources 104 can include any type of computing system that is part of or associated with the computing environment and is available to the PRT system 110. These computing systems can include database systems or repositories, servers (e.g., authentication servers, file servers, email servers, collaboration servers), clients, mobile computing systems (e.g., tablets, laptops, smartphones), virtual machines, CRM systems, and directory services (e.g., lightweight directory access protocol (LDAP)) systems. Further, in some cases, the internal data sources 104 can include client 101 and client 102. The external data sources 105 can include any type of computing system that is not associated with the computing environment, but is accessible to the PRT system 110. For example, the external data sources 105 can include any computing systems associated with cloud services, social media services, and hosted applications.

The PRT system 110 can communicate with the internal data sources 104 via the intranet 106. The intranet 106 can include any type of wired and/or wireless network that enables computing systems associated with the computing environment to communicate with each other. For example, the intranet 106 can include any type of a LAN, a WAN, an Ethernet network, a wireless network, a cellular network, a virtual private network (VPN) and an ad hoc network. In some embodiments, the intranet 106 may include an extranet that is accessible by customers or other users who are external to the business or organization associated with the computing environment.

The PRT system 110 can communicate with the external data sources 105 via the network 107. The network 107 can include any type of wired, wireless, or cellular network that enables one or more computing systems associated with the computing environment to communicate with the external data sources 105 and/or any computing system that is not associated with the computing environment. In some cases, the network 107 can include the Internet.

A user can access the PRT system 110 using any computing system that can communicate with the PRT system 110. For example, the user can access the PRT system 110 using the client 101, which can communicate with the PRT system 110 via the intranet 106, the client 102, which can communicate via a direct communication connection with the PRT system 110, or the client 103, which can communicate with the PRT system 110 via the network 107. As illustrated in FIG. 1, in some embodiments the client 103 may not be associated with the computing environment. In such embodiments, the client 103 and/or a user associated with the client 103 may be granted access to the PRT system 110. The clients 101-103 may include any type of computing system such as a laptop, desktop, smartphone, and tablet. In some embodiments, the PRT system 110 may determine whether the user is authorized to access the PRT system 130.

The PRT system 110 can include a data collection system 120, a PRT classification system 130, and a PRT access system 140. The data collection system 120 can collect data or information from one or more data sources for processing by the PRT system 110. The data collection system 120 can reformat the collected data to facilitate processing by the PRT system 110. The data collection system 120 may reformat collected data into a consistent or defined format that enables the comparison or processing of data that is of the same or a similar type, but which may be formatted differently because the data is obtained from different sources.

The data collection system 120 can include a collection engine 121, an access manager 122, a business logic engine 123, and a business logic security manager 124. The collection engine 121 may access the internal data sources 104 thereby providing the PRT system 110 with access to data that is stored by or generated by the internal data sources 104. In some embodiments, the collection engine 121 can also access the external data sources 105 thereby providing the PRT system 110 with access to data from the external data sources 105.

In some cases, a number of internal data sources 104 and/or external data sources 105 may require a user or system to be identified and/or authenticated before access to the data source is granted. Authentication may be required for a number of reasons. For data sources that require authentication or identification of a specific user, the access manager 122 can facilitate access to the data sources. The access manager 122 can manage and control credentials for accessing the data sources. For example, the access manager 122 can store and manage user names, passwords, account identifiers, certificates, tokens, and any other information that can be used to access accounts associated with one or more internal data sources 104 and/or external data sources 105. As another example, the access manager 122 may have access to credentials associated with an LDAP directory, a file management system, or employee work email accounts. In some embodiments, the access manager 122 may have credentials or authentication information associated with a master or super user account enabling access to some or all of the user accounts without requiring credentials or authentication information associated with each of the users. In some cases, the collection engine 121 can use the access manager 122 to facilitate accessing internal data sources 104 and/or external data sources 105.

The business logic engine 123 can include any system that can modify or transform the data collected by the collection engine 121 into a standardized format. In some embodiments, the standardized format may differ based on the data source accessed and/or the type of data accessed. For example, the business logic engine 123 may format data associated with emails, data associated with files stored at the computing environment, data associated with web pages, and data associated with research files differently. Each type of data, however, may be formatted consistently. A user may also define the format for processing and storing different types of data. In other embodiments, the business logic engine 123 may identify a standard format to use for each type of data based on, for example, the format that is most common among similar types of data sources, the format that reduces the size of the information, or any other basis that can be used to decide a data format.

The business logic security manager 124 can include any system that can implement security and data access policies for data accessed by the collection engine 121. In some embodiments, the business logic security manager 124 may apply the security and data access policies to data before the data is collected as part of a determination of whether to collect particular data. For example, an organization may designate a private folder or directory for each employee and the data access policies may include a policy to not access any files or data stored in the private directory. Alternatively, or in addition, the business logic security manager 124 may apply the security and data access policies to data after it is collected by the collection engine 121. Further, in some cases, the business logic security manager 124 may apply the security and data access policies to the abstracted and/or reformatted data produced by the business logic engine 123. For example, suppose the organization associated with the computing environment has adopted a policy of not collecting emails designated as personal. In this example, the business logic security manager 124 may examine email to determine whether it is addressed to an email address designated as personal (e.g., email addressed to family members) and if the email is identified as personal, the email may be discarded by the data collection system 120 or not processed any further by the PRT system 110.

In some embodiments, the business logic security manager 124 may apply a set of security and data access policies to any data or metadata provided to the PRT classification system 130 for processing and storage. These security and data access policies can include any policy for regulating the storage and access of data obtained or generated by the data collection system 120. For example, the security and data access policies may identify the users who can access the data provided to the PRT classification system 130. The determination of which users can access the data may be based on the type of data. The business logic security manager 124 may tag the data with an identity of the users, or class or role of users (e.g., mid-level managers and more senior) who can access the data.

As noted above, the data collection system 120 can collect data that includes communications (e.g., emails). The data collected by the data collection system 120 can also include, for example, a set of participants who may be accessible to the PRT system 110 for potential PRT classification. For example, in some embodiments, the set of users can include all employees of the business or organization. In these embodiments, the set of users can be acquired, for example, from the internal data sources 104 (e.g., the organization's human resources system, directory services such as an Active Directory).

The data collected by the data collection system 120 can also include, for example, a global set of factors that can be used to calculate a PRT. In an embodiment, the global set of factors can be used to evaluate a general likelihood of a particular recipient responding to a particular and a general response time for that response a sender can expect to receive the response. As noted above, various factors can influence whether a recipient responds to a particular communication. An exemplary list of factors can include 1) a general response history of the recipient, 2) platform generally used for responses, 3) relationship between the sender and the recipient, 4) correlation of Active Directory attributes, 5) history of prior communication between the sender and the recipient, 6) relevance of the communication between the sender and the recipient, 7) short-term availability, and 8) long-term availability. As noted before, there may be other factors that can be evaluated and collected for use with the PRT system 110. These factors may be added or omitted from the PRT system 110, for example, by an administrator of the PRT system 110.

It should be noted that with respect to short-term availability and long-term ability, determination of such information can be derived in different ways. For example, availability can be determined from specific communication platforms by using "presence" history in instant messaging platforms like Microsoft Lync and calendaring information like Microsoft Exchange. Such "presence" history can indicate when the recipient may generally be around their computer (e.g., reading and responding to emails, doing work at their workstation).

The PRT classification system 130 can store and classify the data obtained by the data collection system 120. In addition to predefined classifications, the data classification system 130 can identify and develop new classifications and associations between data using, for example, heuristics and probabilistic algorithms. The data classification system 130 can include a data repository engine 131, a task scheduler 132, an a priori classification engine 133, an a posteriori classification engine 134, a heuristics engine 135, a PRT classification engine 136 and a set of databases 137.

The data repository engine 131 can include any system for storing and indexing the data received from the data collection system 120. The data repository engine 131 can store the data, including any generated indexes, at the set of databases 137, which can include one or more databases or repositories for storing data. In some cases, the set of databases 137 can store data in separate databases based on any factor including, for example, the type of data, the source of data, or the security level or authorization class associated with the data and the class of users who can access the data.

In some implementations, the set of databases 137 can dynamically expand and may be dynamically structured. For example, if the data repository engine 131 receives a new type of data that includes metadata fields not supported by the existing databases of the set of databases 137, the data repository engine 131 can create and initialize a new database that includes the metadata fields as part of the set of databases 137.

In certain embodiments, the data repository engine 131 can create abstractions of and/or classify the data received from the data collection system 120 using, for example, the task scheduler 132, the a priori classification engine 133, the a posteriori classification engine 134, and the heuristics engine 135. The task scheduler 132 can include any system that can manage the abstraction and classification of the data received from the data collection system 120. In some embodiments, the task scheduler 132 can be included as part of the data repository engine 131.

Data that is to be classified and/or abstracted can be supplied to the task scheduler 132. The task scheduler 224 can supply the data to the a priori classification engine 133, which can include any system that can classify data based on a set of user-defined, predefined, or predetermined classifications. These classifications may be provided by a user (e.g., an administrator) or may be provided by the developer of the PRT system 110. Although not limited as such, the predetermined classifications generally include objective classifications that can be determined based on attributes associated with the data (e.g., emails). The a priori classification engine 133 can also classify data at or substantially near the time of collection by the collection engine 121. The a priori classification engine 133 can classify the data prior to the data being stored in the databases 137. However, in some cases, the data may be stored prior to or simultaneously with the a priori classification engine 133 classifying the data. The data may be classified based on one or more characteristics or pieces of metadata associated with the data. For example, an email may be classified based on the email address or the recipient of the email.

In addition to, or instead of, using the a priori classification engine 133, the task scheduler 132 can provide the data to the a posteriori classification engine 134 for classification or further classification. The a posteriori classification engine 134 can include any system that can determine trends with respect to the collected data. Although not limited as such, the a posteriori classification engine 134 generally classifies data after the data has been collected and stored at the databases 137. However, in some cases, the a posteriori classification engine 134 can also be used to classify data as it is collected by the collection engine 121. Data may be processed and classified or reclassified multiple times by the a posteriori classification engine 134. In some cases, the classification and reclassification of the data occurs on a continuing basis. In other cases, the classification and reclassification of data occurs during specific time periods of events.

In some cases, the a posteriori classification engine 228 classifies data based on one or more probabilistic algorithms. The probabilistic algorithms may be based on any type of statistical analysis of the collected data. For example, the probabilistic algorithms may be based on Bayesian analysis or probabilities. Further, Bayesian inferences may be used to update the probability estimates calculated by the a posteriori classification engine 134. In some implementations, the a posteriori classification engine 134 may use machine learning techniques to optimize or update the a posteriori algorithms. In some embodiments, some of the a posteriori algorithms may determine the probability that a piece or set of data (e.g., an email) should have a particular classification based on an analysis of the data as a whole. Alternatively, or in addition, some of the a posteriori algorithms may determine the probability that a set of data should have a particular classification based on the combination of probabilistic determinations associated with subsets of the data, parameters, or metadata associated with the data (e.g., classifications associated with the content of the email, the recipient of the email, the sender of the email).

Using the a posteriori classification engine 134, data may be classified based on metadata associated with the data. The determination of what the data relates to can be based on any criteria. For example, the determination may be based on keywords associated with the data, the data owner, the data author, the identity or roles of users who have accessed the data, the type of data file, the size of the file, and the data the file was created.

In some embodiments, the a posteriori classification engine 134 can use the heuristics engine 135 to facilitate classifying data. Further, in some cases, the a posteriori classification engine 134 can use the heuristics engine 135 to validate classifications, to develop probable associations between potentially related content, and to validate the associations as the data collection system 120 collects more data. In some embodiments, the a posteriori classification engine 134 may base the classifications of data on the associations between potentially related content. In some implementations, the heuristic engine 135 may use machine learning techniques to optimize or update the heuristic algorithms.

In some embodiments, a user (e.g., an administrator) can verify whether the data or metadata has been correctly classified. Based on the result of this verification, in some cases, the a posteriori classification engine 134 may correct or update one or more classifications of previously processed or classified data. Further, in some implementations, the user can verify whether two or more pieces of data or metadata have been correctly associated with each other. Based on the result of this verification, the a posteriori classification engine 134 using, for example, the heuristics engine 135 can correct one or more associations between previously processed data or metadata. Further, in certain embodiments, one or more of the a posteriori classification engine 134 and the heuristics engine 135 may update one or more algorithms used for processing the data provided by the data collection system 120 based on the verifications provided by the user.

In some embodiments, the heuristics engine 135 may be used as a separate classification engine from the a priori classification engine 133 and the a posteriori classification engine 134. Alternatively, the heuristics engine 135 may be used in concert with one or more of the a priori classification engine 133 and the a posteriori classification engine 134. Similar to the a posteriori classification engine 133, the heuristics engine 135 generally classifies data after the data has been collected and stored at the databases 137. However, in some cases, the heuristics engine 135 can also be used to classify data as it is collected by the collection engine 121.

The heuristics engine 135 can use any type of heuristic algorithm for classifying data. For example, the heuristics engine 135 can determine whether a number of characteristics are associated with the data and based on the determination, classify the data. In some cases, the heuristics engine 135 can classify data based on a subset of characteristics. In some cases, the heuristics engine 135 determines whether one or more characteristics are associated with the data. In other words, the heuristics engine can determine whether a particular characteristic is or is not associated with the data. Alternatively, or in addition, the heuristics engine 135 can determine the value or attribute of a particular characteristic associated with the data. The value or attribute of the characteristic may then be used to determine a classification for the data.

The a priori classification engine 133 and the a posteriori classification engine 134 can store the data classification at the databases 137. Further, the a posteriori classification engine 134 and the heuristics engine 135 can store the probable associations between potentially related data at the databases 137. In some cases, as classifications and associations are updated based on, for example, user verifications or updates to the a posteriori and heuristic classification and association algorithms, the data or metadata stored at the databases 137 can be modified to reflect the updates.

The PRT classification engine 136 receives optionally via the task scheduler 132, outputs from the a priori classification engine 133 and the a posteriori classification engine 134. The PRT classification engine 136 can generate PRT data from the outputs. The PRT data may include preemptive data that can be provided to the sender indicating a probability and possible response time for a communication with a recipient. For example, the sender may be provided a prediction by the PRT classification engine 136, prior to sending the communication, whether the recipient will respond based on past the collection and classification of communications involving that same recipient.

With respect to the present invention, the set of factors that can be used to evaluate the various communications and set of individuals of interest (e.g., sender, original recipient, alternative recipient(s)) can be supplied as inputs to the task scheduler 132. The task scheduler 132 can then supply the inputs to the a priori classification engine 133 for calculating one or more metrics that can be used, for example, to measure a likelihood of a particular recipient providing a response to the communication from the sender. The task scheduler 132 can also supply the inputs to the a posteriori classification engine 134 for classification of the PRT inputs. In some embodiments, the a priori classification engine 133 and/or the a posteriori classification engine 134 can use the heuristic engine 135 to classify the PRT inputs (e.g., metrics). As indicated above, the outputs from the a priori classification engine 133 and/or the a posteriori classification engine 135 may be provided to the PRT classification engine 136 for generation of PRT data.

In other embodiments, the PRT engine 136 may provide to the sender a list of possible alternative recipients. The list may rank the alternative recipients based on, for example, a calculated probability of a response and/or response time. These alternative recipients may provide the sender a better probability of receiving a response in comparison to the original intended recipient.

It should be noted that the alternative recipients may be capable of opting out of being listed on such a list. The alternative recipients may also limit what group of senders may view a particular individual as an alternative recipient. In these cases, the identity of such alternative recipients may be hidden from one sender but may be available for others.

Users can communicate with the PRT system 110 using a client computing system (e.g., client 101-103). In some cases, access to the PRT system 110, or to some features of the PRT system 110, may be restricted to users who are using clients associated with the computing environment. At least some users can access the PRT system 110 to verify classifications and associations of data by the PRT classification system 130. In addition, in some cases, at least some users can access at least some of the data and/or metadata stored at the PRT classification system 130 using the PRT access system 140. The PRT access system 140 can include a user interface 141, a workflow engine 142, and an identity manager 143.

The user interface 141 can generally include any system that enables a user to communicate with the PRT system 110. Further, the user interface 141 enables the user to submit a query to the PRT system 110 to access the data or metadata stored at the databases 137. Moreover, the query can be based on any number of or type of data or metadata fields or variables. For example, the query (or request) can include variables, such as the factors described above. Advantageously, in certain embodiments, by enabling, a user to create a query based on any number or type of fields, complex queries can be generated. Since the PRT system 110 can also collect and analyze data from a number of internal 104 and external 105 data sources, a user of the PRT system 110 can extract data that is not typically available by accessing a single data source. The query may return data that is based on a number of sources including, for example, emails received from other users. In this way, the can create a query to obtain a larger picture of an organization's knowledge compared to systems that are incapable of integrating the potentially large number of information sources used by some businesses or organizations.

The workflow engine 142 can include any system that enables the user to create the query. The workflow engine 142 can cause the available types of search parameters for searching the databases 137 to be presented to a user via the user interface 141. These search parameter types can include any type of search parameter that can be used to form a query for searching the databases 137. For example, the search parameter types can include names (e.g., employee names), data categories (e.g., communications), stored data types (e.g., strings, integers, dates, times), data sources (e.g., internal data sources, external data sources, communication sources), and dates. In some cases, the workflow engine 142 can also parse a query provided by a user. For example, some queries may be provided using a text-based interface or using a text-field in a Graphical User Interface (GUI). In such cases, the workflow engine 142 may be configured to parse the query.

The workflow engine 142 can further include any system that enables the user to create or select a query package that serves as the query. In certain embodiments, the workflow engine 142 can maintain query packages for each user, group of users, and/or the like. The query packages can be stored, for example, in a SQL database that maintains each user's query packages in a table by a unique identifier. In some embodiments, each user may have a profile that includes a list of package identifiers for that user. The workflow engine 142 can cause query packages associated with the user to be presented and made selectable via the user interface 141. In various embodiments, the workflow engine 142 can also facilitate creation of new query packages. New query packages can be made accessible to users in various ways. For example, the new query packages can be created by the user, shared with the user by another user, pushed to the user by an administrator, or created in another fashion.

Further, the workflow engine 142 can cause any type of additional options for querying the databases 137 to be presented to the user via the user interface 141. These additional options can include, for example, options relating to how query results are displayed or stored.

Access to the data stored in the PRT system 110 may be limited to specific users or specific roles. For example, access to the data may be limited to "Bob" or to senior managers. Further, some data may be accessible by some users, but not others. For example, sales managers may be limited to accessing information relating to sales, invoicing, and marketing, technical managers may be limited to accessing information relating to product development, design and manufacture, and executive officers may have access to both types of data, and possibly more. In certain embodiments, the workflow engine 142 can limit the search parameter options that are presented to a user for forming a query based on the user's identity and/or role.

The identity manager 143 can include any system for regulating who can access the data or subsets of data. The identity manager 143 can regulate access to the databases 137 and/or a subset of the information stored at the databases 137 based on any number and/or types of factors. For example, these factors can include a user's identity, a user's role, a source of the data, a time associated with the data (e.g., the time the data was created, a time the data was last accessed, an expiration time), and whether the data is historical or current.

Further, the identity manager 143 can regulate access to the databases 137 and/or a subset of the information stored at the databases 137 based on security restrictions or data access policies implemented by the business logic security manager 124. For example, the business logic security manager 124 may identify all data that is "sensitive" based on a set of rules, such as whether the data mentions one or more keywords relating to an unannounced product in development. Continuing this example, the business logic security manager 124 may label the sensitive data as, for example, sensitive, and may identify which users or roles, which are associated with a set of users, can access data labeled as sensitive. The identity manager 143 can then regulate access to the data labeled as sensitive based on the user or the role associated with the user who is accessing the databases 137.

With respect to implementing the PRT access system 140, in an embodiment, the sender may provide a query or request for PRT data through communication with the user interface 141. The query may include, for example, one or more factors as well as the identity of the recipient for which the sender would like to communicate with. In return, the sender may eventually receive PRT data based on the query or request provided through the user interface 141. The PRT data may include, for example, a probability the recipient may respond and a tentative time frame a response can be expected.

Prior to providing the sender with PRT data based on the query, the PRT access system 140 may also evaluate whether the sender has permission to view the PRT data. In particular, the identity manager 143 can determine whether the sender has permission to view the PRT data for the requested recipient. In other embodiments, the identity manager 143 can determine whether the sender has permission to view the PRT data for other alternative recipients. For example, the identity manager 143 can filter and remove PRT data that a particular sender does not have permission to view. In some embodiments, some PRT data may be restricted (e.g., an individual's availability) while other PRT data can be allowed for a particular sender. In some embodiments, some PRT data may be restricted for the sender while the same PRT data may be allowed for other users.

The workflow engine 142 can also monitor the PRT data and periodically generate metrics based thereon. For example, a sender may be provided a probability that a first recipient may respond to a message sent by the sender based, for example, on historical participation related to PRT data. Particular recipients can also be categorized into participation classes (e.g., guaranteed response, faster responder) if specific thresholds (e.g., percentage response or general response time) are attained. In an embodiment, a user (e.g., recipient) can be given credit (e.g., a pre-defined number of points) each time the user, for example, upon receiving an email, responds to the email within a pre-determined period of time. The credit can be used to evaluate the particular recipient and place the recipient into one or more participation classes.

In some embodiments, the user interface 141, in combination with the workflow engine 143, can permit authorized users (e.g., administrators) to manually change generated and assigned PRT classifications, for example, by the PRT classification engine 130. In other embodiments, the authorized users can also manually add PRT classifications for one or more users in the PRT system 110.

The use of classifications, as indicated above, can be beneficial for the sender to identify who, as an alternative, the sender can communicate with. The alternative recipient may more likely have the information being requested by the sender or can contact the original recipient more easily. In the scenario described above, suppose the employee (e.g., sender) decides to choose a potential alternative recipient instead of communicating with the CEO (e.g., original recipient), who may have a low PRT data with respect to the sender, directly. The authorized user may recognize that one or more of the alternative recipients work directly under the CEO (e.g., co-workers, secretary). The authorized user can manually add or revise classifications that were assigned by the PRT classification engine 130. The authorized user may also remove classifications assigned by the PRT classification engine 130, for example, if a particular user (e.g., recipient) would like such classification (e.g., working relationship with an original intended recipient) not to be disclosed.

Although illustrated separately, in some embodiments, the identity manager 143 can be included as part of the workflow engine 142. Further, in some cases, one or both of the identity manager 143 and the workflow engine 142 can be included as part of the user interface 141. In certain embodiments, some or all of the previously described systems can be combined or further divided into additional systems. Further, some or all of the previously described systems may be implemented in hardware, software, or a combination of hardware and software.

Figure 2:
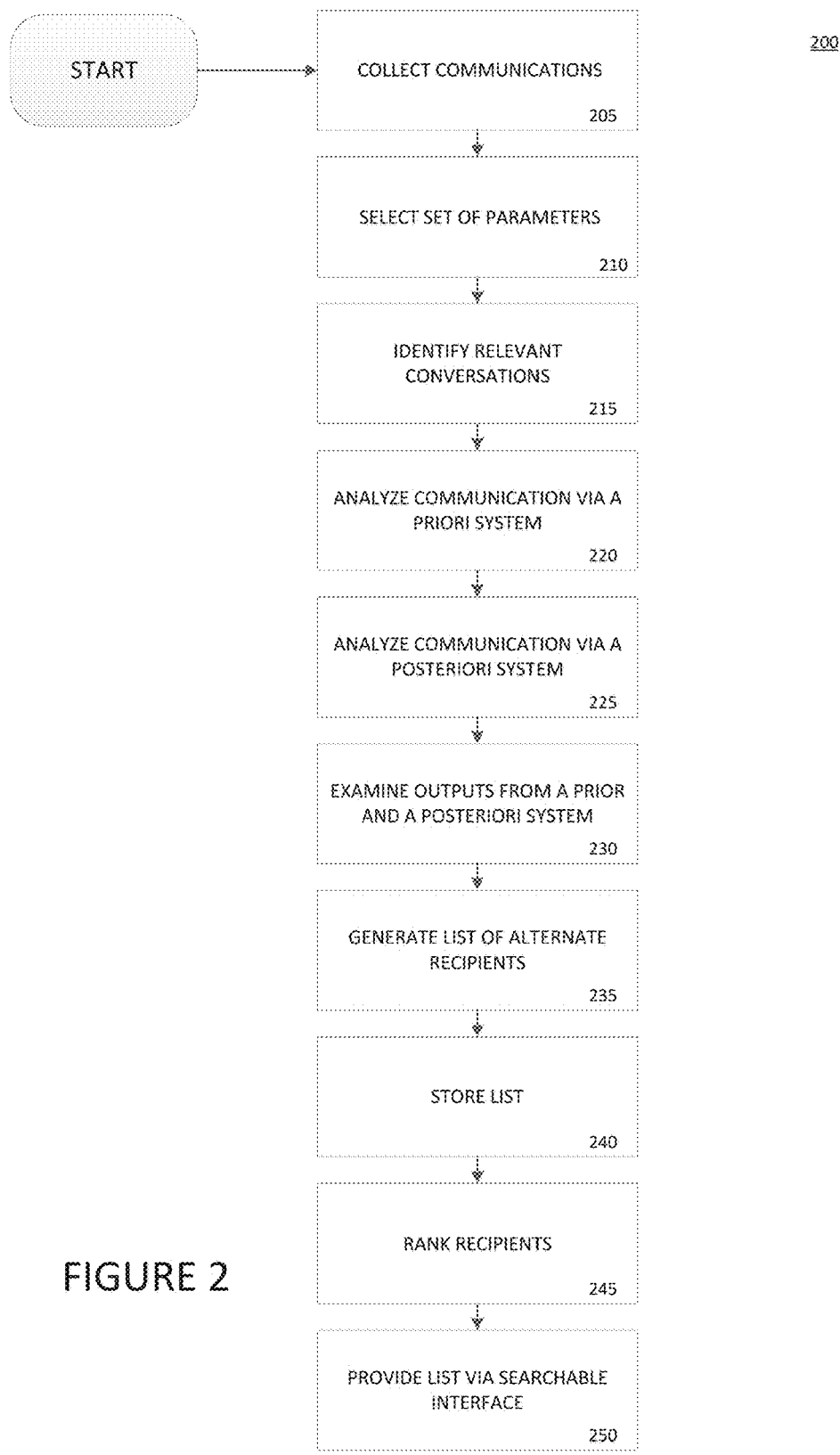
FIG. 2 is a flowchart for calculating PRT for a message between a sender and a recipient.

FIG. 2 is a flowchart for calculating PRT for a message between a sender and a recipient. The process 200 can be implemented by any system that can classify data and/or metadata. For example, the process 200, in whole or in part, can be implemented by the a priori classification engine 133, the a posteriori classification engine 134, the heuristics engine 135 and/or the PRT classification engine 136. In some cases, the process 200 can be performed generally by the PRT classification system 130 or the PRT system 110. Although any number of systems, in whole or in part, can implement the process 200, to simplify discussion, the process 200 can be described in relation to specific systems or subsystems of the PRT system 110.

At step 205, the data collection system 120 can collect communications from a plurality of sources (e.g., internal data sources 104 and/or external data sources 105). For example, the communications collect may include all e-mail correspondences of a business or organization. In particular, the e-mail correspondences may further include e-mails that either the sender and the recipients are involved with. It should be noted that other types of collected communications may also be applicable here as well, including instant messaging.

In step 210, one or more parameters may be selected to evaluate and classify the communications. For example, one or more factors described above may be chosen to evaluate and classify e-mails in order to calculate PRT data. Other parameters may also include the identity of the sender and/or recipient in order to filter all the e-mail correspondences to only include the e-mails where one or both of the individuals are involved in. In some embodiments, the parameters can be pre-selected, for example, by an authorized user (e.g., administrator) of the PRT system 110. In some embodiments, for example, the factors may be manually selected by the sender.

At step 215, for each possible recipient (e.g., the original recipient and alternate recipients), the collected communications can be filtered based on one or more of the parameters above in step 210. Instead of looking at all the collected communications for a business or organization, the method may only consider communications where one or both of the individuals (e.g., sender and recipient) is involved. These communications may also include e-mails where the sender and/or the other potential alternative recipients have been included on the communication as a carbon copy "Cc:" or blind carbon copy "Bcc:" from which a response was provided but are not directly addressed to the sender or recipient.

At step 220, the a priori classification engine 220 may evaluate and classify the relevant collected communications (e-mails where the sender and/or the recipient is involved in). The evaluation and classification can evaluates the communications based on the parameters above. The a priori classification engine 220 can also provide outputs (e.g., metrics) that can be used, for example, by the PRT classification engine 136, to calculate, for example, a probability of response to a future message. It should be noted that the evaluation and classification of the relevant collected data can take into account a decimal or percentage value of the relevant communications pertaining to the recipient. The evaluation and classification can also include statistical values such as, for example, a number of standard deviations that separate the cardinality from a mean value (e.g., a mean value based on a set of verified test data, a mean value across all users, etc. . . . ).

At block 225, the a posteriori classification engine 128 can also evaluate and classify the relevant collected communications. The a posteriori classification engine 128 may evaluate and classify the relevant collected communications using one or more probabilistic algorithms. In an embodiment, the a posteriori classification engine 128 may evaluate and classify the relevant collected communications using the heuristics engine 135.

At step 230, output from the a priori classification engine 133 and/or the a posteriori classification engine 134 can be provided to the PRT classification engine 136. In particular, the PRT classification engine 136 can evaluate the outputs from the a priori and a posteriori classification engines 133, 134 to calculate PRT data for the sender and recipient. The PRT data may include, for example, the probability of the sender receiving a response from the recipient and a measure of time when the response can be expected. In some embodiments, the PRT data may also provide classifications based on the calculated PRT data for the recipient.

At step 235, the PRT classification engine 136 can generate a list of alternative recipients that the sender can communicate with. This step may be optional. In some embodiments, this step can be performed if the sender receives a probability of receiving a response from the recipient that is below a pre-defined threshold value (e.g., 50%). In some embodiments, this step can also be performed if the sender can expect a response that will take longer than a pre-defined threshold (e.g., 2 days). In some embodiments, these thresholds can also be manually inputted by the sender. These pre-defined thresholds may also be adjusted by an authorized user (e.g., administrator) of the PRT system 110.

The list of alternative recipients may include one or more other individuals within the business or organization. In some embodiments, these alternative recipients may possess a similar knowledge base regarding a topic the sender may be requesting about in the intended communication. In some embodiments, these alternative recipients may be individuals who communicate more successfully with the original recipient. The list of alternative recipients may also include their respective PRT data with respect to the sender that can include a probability and expected response time for the particular alternative recipient to respond to the sender. The PRT data for these alternative recipients may be obtained through repetition of the above steps 205-230.

At step 240, the data repository engine 131 can store the data, for example, the data generated in the above steps 220-235. The data can be stored, for example, in one or more of the databases 137.

At step 245, the PRT classification engine 136 may further rank each of the alternative recipients in the generated list based on one or more parameters. For example, the ranking may be performed based on the PRT data (e.g., probability of the sender receiving a response or fastest response time).

At step 250, the PRT access system 140 can provide a searchable interface by which the sender can search (and select) among the various alternative recipients on the generated list. The alternative recipients and corresponding PRT data may be further filtered based on the needs of the user (e.g., needs a response within a certain time frame). The searchable interface can be provided via, for example, the user interface 141.

Figure 3:
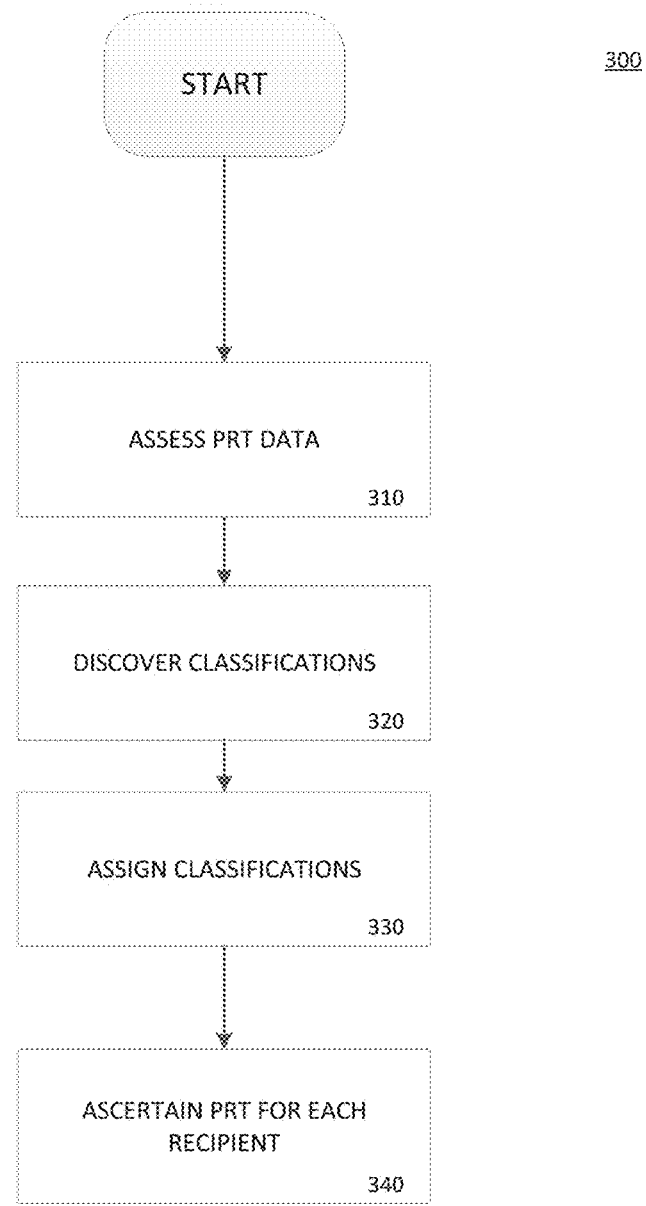
FIG. 3 is a flowchart for discovering and assigning classifications.

FIG. 3 is a flowchart for discovering and assigning classifications. In various embodiments, the process 300 may be performed, for example, as all or part of step 230 of FIG. 2. The process 300 can be implemented by any system that can classify data and/or metadata. For example, the process 300, in whole or in part, can be implemented by the a priori classification engine 133, the a posteriori classification engine 134, the heuristics engine 135, and/or the PRT classification engine 136. In some cases, the process 300 can be performed generally by the PRT classification system 130 or the PRT system 110. Although any number of systems, in whole or in part, can implement the process 300, to simply discussion, the process 300 can be described in relation to specific systems or subsystems of the PRT system 110.

At step 310, the PRT classification engine 136 may assess the PRT data for each recipient. The assessment can then be used to discover and assign one or more PRT classifications for a recipient. The PRT classifications may be beneficial in informing the sender, for example, who to communicate with.

At steps 320 and 330, the PRT classification engine 136 may discover and assign classifications. The discovery and assignment of PRT classifications may be based on information obtained during step 230 of FIG. 2. The PRT classification engine 136 can assign various PRT classifications for an individual (e.g., recipient) that can also be interpreted as PRT related data. For example, the PRT classification engine 136 can use pre-existing user-classification data such as job titles (e.g., manager, vice present, CEO) and employee classifications (e.g., contractor, part-time). Pre-existing user-classification data can be collected, for example, from an organization's human resources system, directory services (e.g., Active Directory), and/or the like. Other classifications may include membership to committee or sub-groups or existing working relationships between individuals (e.g., supervisor, secretary) that may be indicative of responsiveness for communications between the two individuals or a shared knowledge base. It may be possible that an individual can be assigned multiple different classifications that can be assigned. The classifications may also be continually updated on a regular basis.

At step 340, the PRT classification engine 136 can provide to the sender, for example, PRT data including probabilities of response and probable response time with respect to a particular recipient. The calculations to obtain such PRT data can incorporate a variety of different data including the relevant communications and the outputs from the a priori and a posteriori systems 133, 134 obtained in steps 220 and 225 of FIG. 2.

The PRT classification engine 136 can also incorporate the various PRT classifications discovered and assigned to each recipient in steps 320 and 330. It should be noted that various types of relevant data may be incorporated for the PRT classification engine 136 to consider when calculating PRT data for a particular recipient. In some embodiments, the list of possible recipients can be ranked based on the calculated PRT data. In other embodiments, the sender may also provide input indicating what types of information (e.g., probability of response, response time) may be considered to be more important or given heavier emphasis. The PRT classification engine 136 can then evaluate the list of alternative recipients based on the input of the sender.

As indicated above, the PRT classification engine 136 may provide the list of alternative recipients to the sender ranked on their PRT data. In another embodiment, it may be possible to rank the list of alternative recipients based on the subject matter of the communication. For example, if the sender requires information about a particular topic, the list of possible recipients can be based on who most likely has or can at least obtain the requested information.

Figure 4:
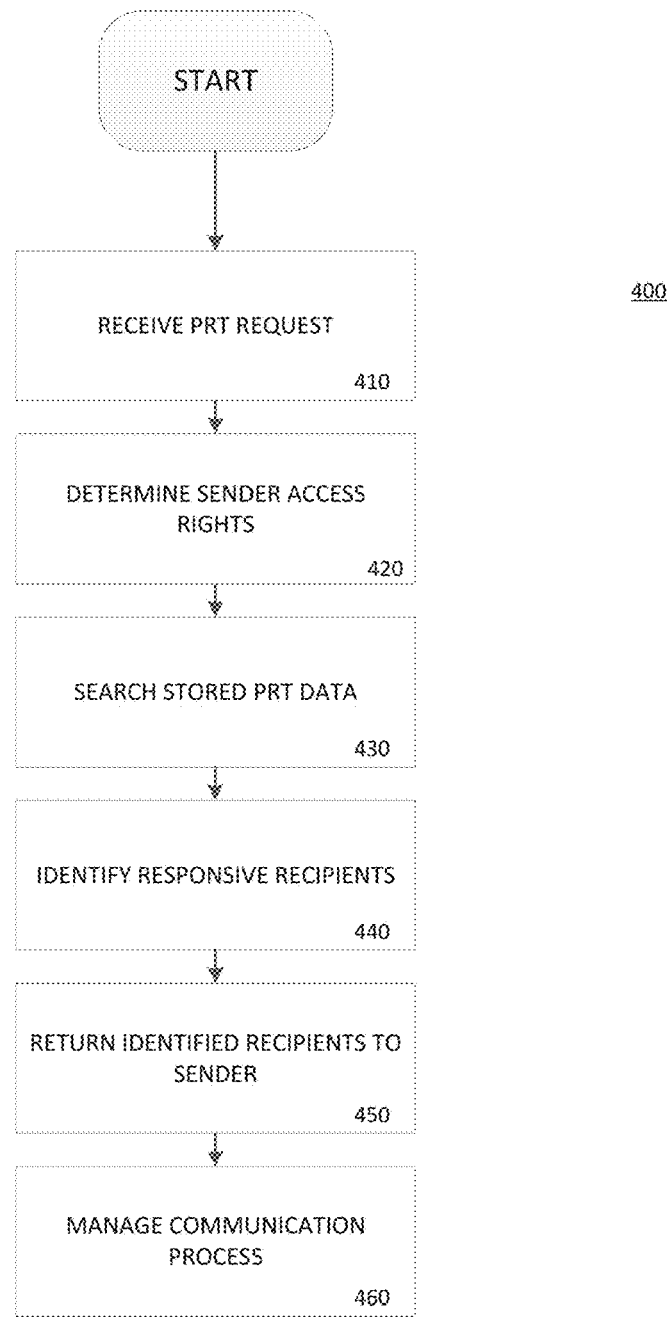
FIG. 4 is a flowchart for managing a PRT search.

FIG. 4 is a flowchart for managing a PRT search. In particular, the PRT search may be directed at finding one or more alternative recipients the sender can communicate with in a situation where the original recipient may be non-responsive. The process 400 can be implemented by any system that can facilitate interaction among users. For example, the process 400, in whole or in part, can be implemented by the user interface 141, the identity manager 143, and/or the workflow engine 142. In some cases, the process 400 can be performed generally by the PRT access system 140 or the PRT system 110. Although any number of systems, in whole or in part, can implement the process 400, to simply discussion, the process 400 can be described in relation to specific systems or subsystems of the PRT system 110.

At step 410, the user interface 141 may receive a PRT request from a sender via a searchable interface such as, for example, the searchable interface provided at step 250 of FIG. 2. In an embodiment, the PRT request may include at least one alternative recipient based on at least one parameter (e.g., one of the factors described above). The PRT request may also include one or more parameters provided by the sender that can filter the list of alternative recipients. For example, the sender may request that alternative recipients have a probability of response higher than a specified threshold value (e.g., >75%) or a response time faster than a specified threshold (e.g., <1 hour). In another embodiment, the sender may provide such parameters as an allowable range (e.g., 70-95% probability of responding or response time between 1-2 hours). The PRT request may further include pre-existing user-classifications as described above in steps 320 and 330 of FIG. 3. There may be other parameters that a sender can provide with the PRT request that can better filter the list of one or more recipients. The filtering can ensure that the one or more recipients that the sender eventually chooses to communicate with can most assist the sender in obtaining the requested information.

At step 420, the identity manager 143 can determine access rights the sender may have with respect to various information based on the PRT request of the sender. For example, the identity manager 143 can determine whether the sender has permission to view PRT data for particular recipients.

At step 430, the workflow engine 142 may search stored PRT data (e.g., in the databases 137) based on the PRT request of the sender. The PRT data may include information relating to a particular recipient's responsiveness. The PRT data may also include additional information (e.g., classifications, knowledge-base) that can be used to inform whether the sender would like to communicate with.

At step 440, the workflow engine 142 can identify relevant PRT data corresponding to the listed recipients stored in the databases 137. The workflow engine 142 can then access the relevant PRT data in order to provide better indication to the sender about, for example, the responsiveness of a particular recipient.

At step 450, to an extent permitted by the access rights of the sender, the workflow engine 142 can provided the relevant PRT data and other information about one or more alternate recipients to the sender. The identity manager 143 can then filter based on the access rights of the sender. In some embodiments, step 410 can include the filtering.

In step 460, the workflow engine 142 can facilitate communication between the sender and one or more recipients. For example, the workflow engine 142 may forward the communication of the sender to the chosen recipient. In another embodiment, the sender may be able to select more than one recipient and have the workflow engine 142 forward the communication to each of the chosen recipients. It may be possible, in another embodiment, that the sender communicates directly with one or more recipients (e.g., via instant messaging or telephone) whereby the sender can attempt to obtain the requested information from the alternative recipient.

Figure 5:
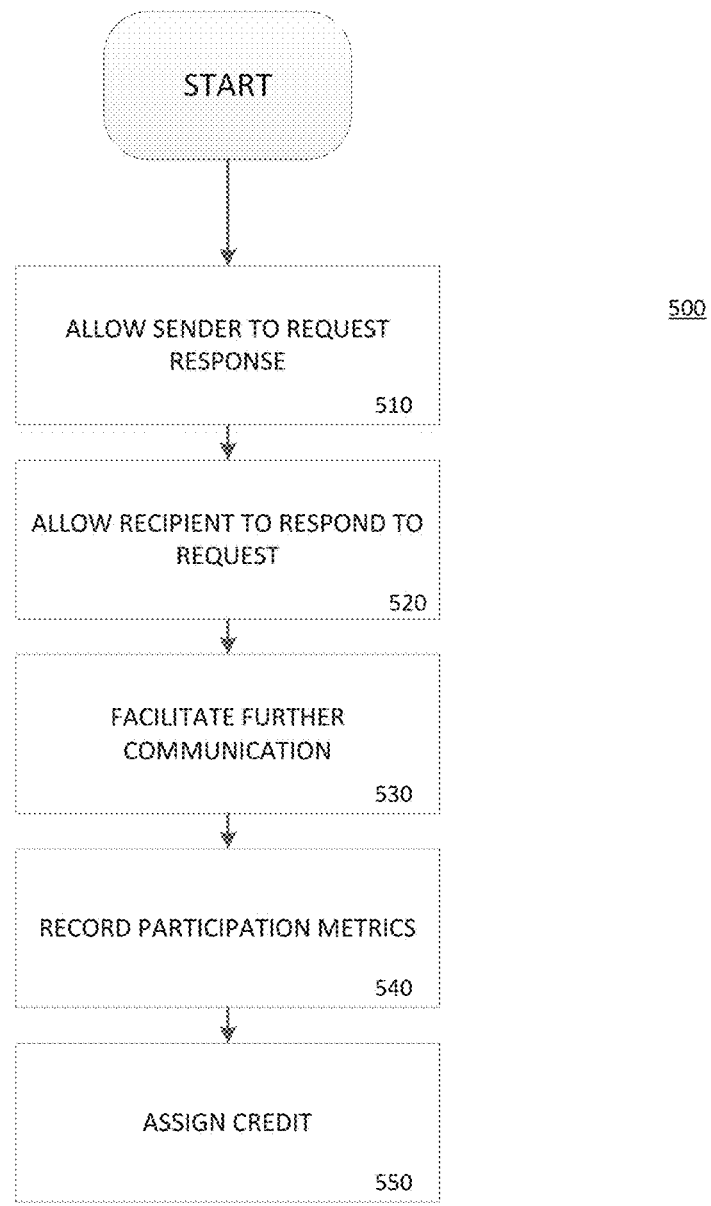
FIG. 5 is a flowchart for managing a communication process between a sender and one or more chosen recipients.

FIG. 5 is a flowchart for managing a communication process between a sender and one or more chosen recipients. In some embodiments, the process 500 can perform all or part of the block 460 of FIG. 4. The process 500 can be implemented by any system that can facilitate interaction among users. For example, the process 500, in whole or in part, can be implemented by the user interface 141, the identity manager 143, and/or the workflow engine 142. In some cases, the process 500 can be performed generally by the PRT access system 140 or the PRT system 110. Although any number of systems, in whole or in part, can implement the process 500, to simplify discussion, the process 500 can be described in relation to specific systems or subsystems of the PRT system 110.

In step 510, the workflow engine 142 may allow the sender, via the user interface 141, to request a response from one or more recipients from the list of alternative recipients disclosed above. The recipients can be, for example, recipients that have a higher probability of responding to the sender compared to the original recipient. In an embodiment, the request for a response from the sender may be directed towards obtaining information about a particular topic that the original recipient may have. The request may also include instructions from the sender to the chosen recipient to forward the communication (e.g., e-mail) to the original recipient. In step 510, the workflow engine 142 can provide the request (and any related communication) from the sender to the chosen alternative recipient. In some embodiments, if the sender does not have permission to view PRT data for a particular chosen alternate recipient, the workflow engine 142 can notify the sender that one or more recipients may not be contacted and instead provide other suggested recipients for the sender to contact.

At step 520, the workflow engine 142 can allow the chosen recipient to respond to the request from the sender. The response may, for example, be in the form of a return email, instant message or phone. In an embodiment, the recipient can authorize the PRT system 110 to identify themselves to the sender and notify that the request (e.g., forwarding the communication to the original intended recipient) is being carried out. In some embodiments, the chosen alternative recipient can also be permitted to accept the request from the sender, ask for clarification regarding the request and deny the request.

At step 530, the workflow engine 142 may further facilitate additional communication between the sender and the chosen alternative recipient as necessary. For example, the workflow engine 142 can prompt the sender for any clarification asked for by the chosen alternative recipient, provide the clarification from the sender to the chosen alternative recipient (e.g., via a subsequent communication), allow the chosen alternative recipient to request further clarification, etc. . . In an embodiment, step 530 can include further iterations of the functionalities described in above in steps 510 and 520.

At step 540, the workflow engine 142 can record, for example, participation metrics in the databases 137. For example, the workflow engine 142 can record each response by the chosen alternate recipient, each request by the sender, acceptance of the PRT request by the chosen alternative recipient, and denial of the PRT service by the chosen alternative recipient. The response can be recorded and later used for future PRT data calculations relating to that particular recipient.

At step 550, the workflow engine 142 can assign credit (e.g., points) to the chosen alternative recipient responsive to the PRT request of the sender. In an embodiment, the workflow engine 142 can maintain an ongoing or cumulative score based on a responsiveness of a recipient. For example, the recipient may be awarded credit (e.g., points) for responding to the sender's request, accepting the request, and denying the request. In an embodiment, the credit may be greatest for accepting the request of the sender and least for denying the request of the sender. In some embodiments, the workflow engine 142 can maintain a score for each possible recipient based on their responsiveness to requests from various senders where such score can be used by the sender as a parameter for filtering.

In an embodiment, the scores described above can be used to classify possible recipients based on their responsiveness in the PRT system 110. For example, individuals having a score higher than a pre-defined threshold, or higher relative to other individuals, can be awarded a special status or title. Company may also utilize these scores to award individuals (e.g., provide incentives) for facilitating communication flow within the company As indicated above, the score (and any corresponding status or title derived from the scores) can be used as a parameter as part of the searchable interface in step 250 of FIG. 2. The parameter can also be specified as part of the PRT request at step 410 of FIG. 1.

Figure 6:
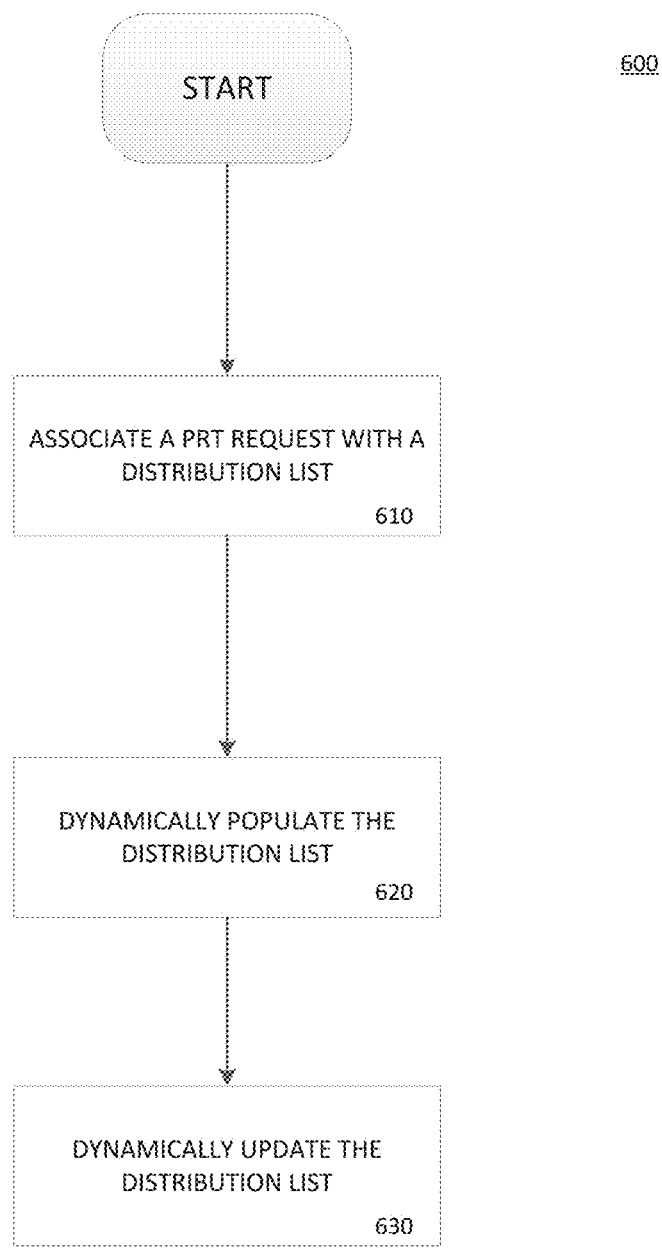
FIG. 6 is a flowchart for establishing a dynamic distribution list.

FIG. 6 is a flowchart for establishing a dynamic distribution list. In particular the dynamic distribution list may be a list of alternative recipients that can be accessed by different senders with reference to a particular original recipient. This dynamic distribution list may be stored within the PRT system 110 (e.g., the plurality of databases 137) and be referred to when the particular original recipient is identified as an intended recipient of a communication from a sender. In some embodiments, the process 600 can be performed in association with or as part of the process 400 of FIG. 4 and/or the process 500 of FIG. 5. The process 600 can be implemented by any system that can facilitate interaction among users. For example, the process 600, in whole or in part, can be implemented by the user interface 141, the identity manager 143, and/or the workflow engine 142. In some cases, the process 600 can be performed generally by the PRT access system 130 or the PRT system 110. Although any number of systems, in whole or in part, can implement the process 600, to simplify discussion, the process 600 can be described in relation to specific systems or subsystems of the PRT system 110

At step 610, the workflow engine 142 can associate PRT requests with a distribution list. The PRT request can be, for example the PRT request described above in connection with step 410 of FIG. 4. In various embodiments, the PRT request may be associated with the distribution list containing one or more alternative recipients that are generally responsive to input from a variety of different senders. For example, the sender may request a list of possible alternative recipients who may be highly responsive on Apache™ Hadoop® and instruct that a dynamic distribution list be established based on the PRT request.

At step 620, the workflow engine 142 can populate the dynamic distribution list with results of the PRT request that are obtained via a process such as, for example, the process 400 of FIG. 4. The population can involve populating the dynamic distribution list with contact information in conformance to the communication method of the dynamic distribution list (e.g., e-mail, corporate messaging service, etc. . .) as well as in conformation to the particular access rights of the sender.

At step 630, the workflow engine 142 can update the dynamic distribution list each time a PRT request is executed. For example, additional PRT data may be retrieved that can alter the PRT data for one or more listed alternative recipients. In some embodiments, the PRT request can be re-executed each time one or more senders attempt to send a communication to the distribution list. In some embodiments, the PRT request can be re-executed at predetermined intervals, on-demand, and/or the like.

In an embodiment, the process 600 permits communications to be sent to a changing group of possible alternative recipients that are responsive to senders within a business or organization. For example, as more recipients are identified relative to a given PRT request, a corresponding dynamic distribution list can remain current and up-to-date. In this fashion, one or more of the responsive alternative recipients associated with the business or organization can be contacted in order to ensure that a communication a particular sender can be responded to with the requested information being sought.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method, comprising:
    collecting a plurality of electronic communications from a plurality of sources, wherein the plurality of electronic communication includes electronic mail within an organization or network;
    receiving a request from a sender, wherein the request pertains to the sender intending to electronically communicate with a first recipient via an electronic message having a particular type;
    evaluating a set of the plurality of collected electronic communication relevant to the sender and the first recipient that includes one or more electronic messages from the sender and the first recipient, the evaluating to derive a probability of the sender receiving a response from the first recipient and a prediction as to when the response may be provided to the sender from the first recipient based on the electronic message being the same type of message as the set of the plurality of electronic collected communication;

informing the sender of the probability of the sender receiving a response to the electronic message from the first recipient and a prediction as to when the response to the electronic message may be provided to the sender from the first recipient;

generating a list of one or more alternate recipients that are more responsive than the first recipient, wherein the list includes corresponding probability of the sender to receive the response and a time frame the response may be provided to the sender for each alternate recipient;

displaying, via a user interface, the list of one or more alternate recipients with corresponding probability of the sender receiving the response and the time frame the response may be provided to the sender for each alternate recipient for the sender to view, each of the one or more alternate recipients in the list being selectable to trigger the electronic message to be sent to the respective alternate recipient;

receiving, via the user interface, a selection of one or more of the alternate recipients; and sending an electronic mail to the selected one or more alternate recipients with an invitation to respond to the electronic mail.

2. The method of claim 1, further comprising:

evaluating access rights of the sender, the access rights dictating who the sender can communicate with; and updating the list of one or more alternate recipients based on the access rights of the sender.

3. The method of claim 1, wherein selecting one or more alternate recipients is based on one or more parameters, the one or more parameters filtering the one or more alternate recipients.

4. The method of claim 3, wherein the filtering of the one or more alternate recipients includes probability of response, response time, similar knowledge base, and pre-existing user-classification.

5. The method of claim 1, wherein informing the sender further includes providing the one or more factors used for evaluating the probability of the sender receiving the response and the time frame the response may be provided to the sender.

6. The method of claim 5, wherein the one or more factors include availability of the recipient, general history of responsiveness by the recipient, communication history between sender and recipient, subject matter, relationship between sender and recipient and urgency.

7. The method of claim 1, wherein informing the sender of the probability of the sender receiving a response includes directing the sender to look for one or more alternate recipients.

8. The method of claim 7, wherein the directing the sender to look for alternate recipients directs the sender to review one or more alternate recipients that have similar knowledge base as the first recipient.

9. The method of claim 7, wherein the directing the sender to look for alternate recipients directs the sender to review one or more alternate recipients that communicate with the first recipient.

10. A system to determine predictive response time across enterprise communication systems, the system comprising:

a memory and a processor, wherein the memory is configured to store instruction modules executed by the processor, the instruction modules comprising: a data collection system, an access system, and a classification system, wherein the data collection system is configured to collect a plurality of electronic communication from a plurality of sources, the plurality of electronic communication including electronic mail within an organization or network;

wherein the access system is configured to receive a request from a sender to electronically communicate with a first recipient via an electronic message having a particular type;

wherein the classification system is configured to:

select one or more factors used for evaluating a probability of the sender receiving the response from the first recipient and a time frame the response may be provided to the sender, the one or more factors including a type of electronic message;

evaluate the plurality of collected electronic communication relevant to the sender and the first recipient based on the one or more factors including the type of electronic message, wherein the evaluating derives a probability of the sender receiving a response from the first recipient and a prediction as to when the response may be provided to the sender from the first recipient based on the electronic message being the same type of message as the set of the plurality of electronic collected communication;

inform the sender of the probability of the sender receiving a response to the electronic message from the first recipient and a prediction as to when the response to the electronic message may be provided to the sender from the first recipient;

generate a list of one or more alternate recipients that are more responsive than the first recipient, each of the one or more alternate recipients in the list being selectable to trigger the electronic message to be sent to the respective alternate recipient, wherein the list includes a corresponding probability of the sender receiving the response and time frame the response may be provided to the sender for each alternate recipient;

display, via a user interface, the list of one or more alternate recipients for the sender to view;

receive, via the user interface, a selection, from the sender, of one or more of the alternate recipients; and send an electronic mail to the selected one or more alternate recipients with an invitation to respond to the electronic mail.

11. The system of claim 10, wherein the access system is further configured to evaluate access rights of the sender, the access rights dictating who the sender can communicate with.

12. The system of claim 10, wherein the classification system is further configured to update the list of one or more alternate recipients based on the access rights of the sender.

13. The system of claim 10, wherein the electronic mail includes instructions to the selected one or more alternate recipients to forward the electronic mail to the first recipient.

14. The system of claim 10, wherein receiving the selection of the one or more alternate recipients is based on one or more parameters, the one or more parameters filtering the one or more alternate recipients, wherein the one or more parameters of the sender includes probability of the sender receiving the response higher than a pre-defined threshold, response time faster than a pre-defined threshold, similar knowledge base as first recipient, and pre-existing user-classification.

15. The system of claim 10, wherein the one or more factors used for evaluating the probability of the sender receiving the response and the time frame the response may be provided to the sender include availability of the recipient, general history of responsiveness by the recipient, communication history between sender and recipient, subject matter, relationship between sender and recipient and urgency.

16. The system of claim 10, wherein the informing directs the sender to look for alternate recipients.

17. The system of claim 15, wherein the alternate recipients includes alternate recipients that have similar knowledge base as the first recipient and recipients that communicate with the first recipient.

* * * * *